US011181986B2

(12) United States Patent
Chen et al.

(10) Patent No.: US 11,181,986 B2
(45) Date of Patent: Nov. 23, 2021

(54) CONTEXT-SENSITIVE HAND INTERACTION

(71) Applicant: GOOGLE LLC, Mountain View, CA (US)

(72) Inventors: Shiqi Chen, Mountain View, CA (US); Jonathan Tompson, Mountain View, CA (US); Rahul Garg, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/947,833

(22) Filed: Aug. 19, 2020

(65) Prior Publication Data
US 2020/0379576 A1 Dec. 3, 2020

Related U.S. Application Data

(63) Continuation of application No. 16/100,748, filed on Aug. 10, 2018, now Pat. No. 10,782,793.

(60) Provisional application No. 62/543,775, filed on Aug. 10, 2017.

(51) Int. Cl.
*G06F 3/01* (2006.01)
*G06T 7/70* (2017.01)
*G06T 19/00* (2011.01)

(52) U.S. Cl.
CPC .............. *G06F 3/017* (2013.01); *G06F 3/011* (2013.01); *G06F 3/013* (2013.01); *G06T 7/70* (2017.01); *G06T 19/006* (2013.01)

(58) Field of Classification Search
CPC .......... G06F 3/017; G06F 3/011; G06F 3/013; G06T 7/70; G06T 19/006
See application file for complete search history.

(56) References Cited

U.S. PATENT DOCUMENTS

| 5,977,935 A | 11/1999 | Yasukawa et al. |
| 6,141,015 A * | 10/2000 | Tanaka .................... G06T 19/20 |
| | | 345/424 |
| 8,230,367 B2 | 7/2012 | Bell et al. |

(Continued)

FOREIGN PATENT DOCUMENTS

| CN | 103218041 A | 7/2013 |
| CN | 103927002 A | 7/2014 |

(Continued)

OTHER PUBLICATIONS

"Open sourced, gloveless, 6DOF hand/arm/finger tracking + gun for virtual Reality for less than $50 . . . ", FeelThree (http://www.feelthree.com/2014/09/6dof-handarmfinger-tracking), printed Apr. 13, 2015, 22 pages.

(Continued)

*Primary Examiner* — Jose R Soto Lopez
(74) *Attorney, Agent, or Firm* — Brake Hughes Bellermann LLP

(57) ABSTRACT

Systems and methods for context-sensitive hand interaction with an immersive environment are provided. An example method includes determining a contextual factor for a user and selecting an interaction mode based on the contextual factor. The example method may also include monitoring a hand of the user to determine a hand property and determining an interaction with an immersive environment based on the interaction mode and the hand property.

18 Claims, 10 Drawing Sheets

(56) References Cited

U.S. PATENT DOCUMENTS

| | | | |
|---|---|---|---|
| 8,502,780 B1* | 8/2013 | Park | G06F 3/04886 345/165 |
| 8,872,853 B2 | 10/2014 | Geisner et al. | |
| 9,122,311 B2 | 9/2015 | Galor | |
| 9,285,589 B2* | 3/2016 | Osterhout | G06F 3/005 |
| 9,703,410 B2* | 7/2017 | Algreatly | G06F 3/04815 |
| 9,851,803 B2 | 12/2017 | Fisher et al. | |
| 10,416,834 B1* | 9/2019 | Holz | G06F 3/011 |
| 2003/0095140 A1* | 5/2003 | Keaton | G06F 3/042 715/700 |
| 2004/0236541 A1 | 11/2004 | Kramer et al. | |
| 2005/0162402 A1 | 7/2005 | Watanachote | |
| 2006/0241792 A1* | 10/2006 | Pretlove | G06Q 50/00 700/83 |
| 2009/0027337 A1* | 1/2009 | Hildreth | G06F 3/0482 345/158 |
| 2009/0147991 A1 | 6/2009 | Chau | |
| 2009/0217211 A1* | 8/2009 | Hildreth | G06F 3/017 715/863 |
| 2009/0315839 A1 | 12/2009 | Wilson et al. | |
| 2010/0053151 A1 | 3/2010 | Marti et al. | |
| 2010/0302145 A1 | 12/2010 | Langridge et al. | |
| 2011/0107216 A1 | 5/2011 | Bi | |
| 2011/0191707 A1 | 8/2011 | Lee et al. | |
| 2011/0199389 A1* | 8/2011 | Lu | H04N 19/60 345/619 |
| 2011/0289456 A1* | 11/2011 | Reville | G06F 3/017 715/830 |
| 2012/0113223 A1* | 5/2012 | Hilliges | G06F 3/011 348/46 |
| 2012/0157201 A1 | 6/2012 | Mizutani et al. | |
| 2012/0162603 A1* | 6/2012 | Dejima | G06F 3/013 351/209 |
| 2012/0218395 A1* | 8/2012 | Andersen | G06F 3/017 348/77 |
| 2012/0235899 A1* | 9/2012 | Han | G06F 3/017 345/156 |
| 2012/0235912 A1 | 9/2012 | Laubach | |
| 2012/0262558 A1* | 10/2012 | Boger | A61B 5/165 348/61 |
| 2013/0147836 A1* | 6/2013 | Small | G06F 3/013 345/633 |
| 2013/0283208 A1* | 10/2013 | Bychkov | G06F 3/017 715/810 |
| 2013/0335303 A1* | 12/2013 | Maciocci | G06F 3/017 345/8 |
| 2014/0078176 A1* | 3/2014 | Kim | G06F 3/017 345/633 |
| 2014/0104274 A1 | 4/2014 | Hilliges et al. | |
| 2014/0104320 A1 | 4/2014 | Davidson et al. | |
| 2014/0168261 A1* | 6/2014 | Margolis | A63F 13/65 345/633 |
| 2014/0184496 A1 | 7/2014 | Gribetz et al. | |
| 2014/0184550 A1* | 7/2014 | Hennessey | G06F 3/013 345/173 |
| 2014/0198132 A1* | 7/2014 | Tsutsui | G06F 3/04812 345/661 |
| 2014/0201674 A1* | 7/2014 | Holz | G06F 3/0346 715/782 |
| 2014/0204002 A1* | 7/2014 | Bennet | G06F 3/04815 345/8 |
| 2014/0225918 A1* | 8/2014 | Mittal | G06F 3/017 345/633 |
| 2014/0237366 A1* | 8/2014 | Poulos | G06F 3/011 715/728 |
| 2014/0266988 A1* | 9/2014 | Fisher | G06F 3/014 345/8 |
| 2014/0320389 A1* | 10/2014 | Scavezze | G06K 9/6267 345/156 |
| 2014/0364212 A1* | 12/2014 | Osman | G06F 3/013 463/31 |
| 2015/0084866 A1 | 3/2015 | Thomas et al. | |
| 2015/0130790 A1 | 5/2015 | Vasquez et al. | |
| 2015/0145887 A1* | 5/2015 | Forutanpour | G02B 27/017 345/633 |
| 2015/0169176 A1 | 6/2015 | Sills et al. | |
| 2015/0205358 A1* | 7/2015 | Lyren | G06F 3/04883 715/765 |
| 2015/0258432 A1 | 9/2015 | Tokubo et al. | |
| 2015/0261318 A1* | 9/2015 | Scavezze | G06F 3/017 345/158 |
| 2015/0338924 A1* | 11/2015 | Watanabe | G06T 3/40 345/156 |
| 2015/0363996 A1 | 12/2015 | Keilwert et al. | |
| 2016/0004306 A1* | 1/2016 | Maltz | G06F 3/013 345/173 |
| 2016/0004320 A1 | 1/2016 | Lundberg et al. | |
| 2016/0018985 A1 | 1/2016 | Bennet et al. | |
| 2016/0030835 A1* | 2/2016 | Argiro | G06F 3/016 463/33 |
| 2016/0085379 A1 | 3/2016 | Cho et al. | |
| 2016/0085403 A1* | 3/2016 | Koga | G06F 3/04842 345/684 |
| 2016/0109947 A1* | 4/2016 | George-Svahn | G06F 3/03547 345/156 |
| 2016/0179336 A1* | 6/2016 | Ambrus | G02B 27/017 715/768 |
| 2016/0189427 A1 | 6/2016 | Wu et al. | |
| 2016/0216761 A1* | 7/2016 | Klingstrom | G06F 3/0484 |
| 2016/0291768 A1* | 10/2016 | Cho | G06F 3/014 |
| 2016/0316081 A1* | 10/2016 | Matsuki | G06F 3/0304 |
| 2016/0378176 A1* | 12/2016 | Shiu | G06F 3/011 345/633 |
| 2017/0038830 A1 | 2/2017 | Clement et al. | |
| 2017/0060230 A1* | 3/2017 | Faaborg | G06T 19/006 |
| 2017/0090566 A1* | 3/2017 | George-Svahn | G06F 3/013 |
| 2017/0097753 A1* | 4/2017 | Bailey | G06F 3/013 |
| 2017/0160927 A1 | 6/2017 | Pate | |
| 2017/0235360 A1* | 8/2017 | George-Svahn | G06F 3/03547 345/173 |
| 2017/0235372 A1* | 8/2017 | Song | G06F 3/017 345/158 |
| 2017/0287214 A1* | 10/2017 | Anderson | G06T 19/006 |
| 2017/0364198 A1* | 12/2017 | Yoganandan | G06F 3/0482 |
| 2018/0046352 A1* | 2/2018 | Johnson | G06F 3/04812 |
| 2018/0136465 A1* | 5/2018 | Chi | G06F 3/0416 |
| 2018/0150147 A1* | 5/2018 | Fujimaki | G06F 3/017 |
| 2018/0173417 A1* | 6/2018 | Foresti | G06F 3/013 |
| 2018/0181199 A1* | 6/2018 | Harvey | G06F 3/014 |
| 2018/0217379 A1* | 8/2018 | Nishizawa | G06F 1/163 |
| 2018/0275764 A1* | 9/2018 | Lee | G06K 9/00355 |
| 2018/0300952 A1* | 10/2018 | Evans | G06F 3/04845 |
| 2018/0307303 A1* | 10/2018 | Powderly | G02B 27/017 |
| 2018/0314416 A1* | 11/2018 | Powderly | G06F 3/017 |
| 2018/0322701 A1* | 11/2018 | Pahud | G06F 3/017 |
| 2018/0348986 A1* | 12/2018 | Sawaki | G06F 3/04815 |
| 2018/0356905 A1* | 12/2018 | Kawai | G01S 17/08 |
| 2019/0146578 A1* | 5/2019 | Ikuta | G06F 3/04847 345/8 |
| 2019/0258320 A1* | 8/2019 | Yang | G06T 19/006 |
| 2019/0304406 A1* | 10/2019 | Griswold | G09G 5/14 |

FOREIGN PATENT DOCUMENTS

| | | |
|---|---|---|
| CN | 107533373 A | 1/2018 |
| GB | 2534386 A | 7/2016 |
| JP | 2018522310 A | 8/2018 |
| WO | 2014145166 A2 | 9/2014 |
| WO | 2016115976 A1 | 7/2016 |
| WO | 2017024142 A1 | 2/2017 |

OTHER PUBLICATIONS

International Preliminary Report on Patentability for International Application PCT/US2016/045568, dated Feb. 15, 2018, 11 pages.
International Search Report and Written Opinion for International Application No. PCT/US2018/046223, dated Jan. 15, 2019, 22 pages.

(56) References Cited

OTHER PUBLICATIONS

Argelaguet, Ferran, et al., "A survey of 3D object selection techniques for virtual environments", Computers & Graphics, vol. 37, No. 3, May 1, 2013, pp. 121-136.

Cashion, Jeffrey, et al., "Automatic 3D selection technique assignment using real-time scenario analysis", 2013 IEEE Virtual Reality (VR), IEEE, Mar. 18, 2013, pp. 103-104.

Johnson, Eric, "Leap Motion Hooks Up to Oculus for Controller-Free Virtual Reality", Johnson, "Leap Motion Hooks Up to Oculus for Controller-Free Virtual Reality", <Re/code> (http://on.recode.net/1vnj7VS), Aug. 28, 2014, 3 pages, 3 pages.

International Search Report and Written Opinion for PCT/US2016/45568, dated Nov. 11, 2016, 16 Pages.

Prachyabrued, Mores, et al., "Visual feedback for virtual grasping", 2014 IEEE Symposium on 3D User Interfaces (3DUI), Mar. 29, 2014, pp. 19-26.

U.S. Appl. No. 16/100,748, filed Aug. 10, 2018, Allowed.

\* cited by examiner

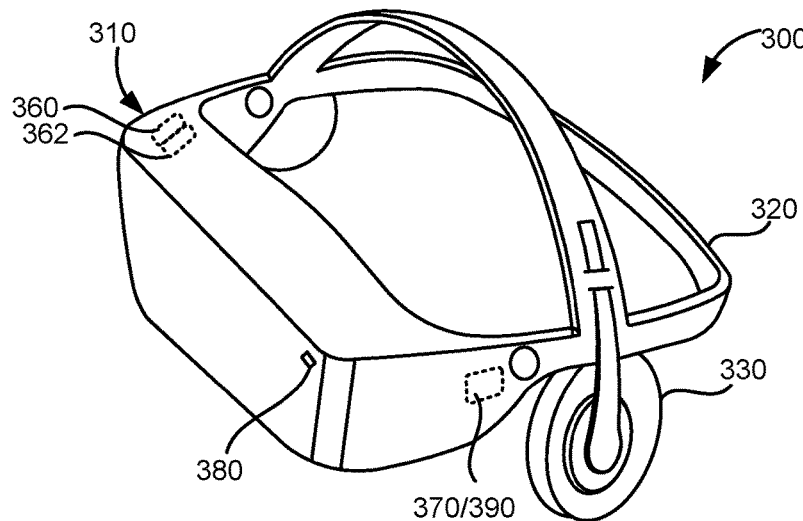
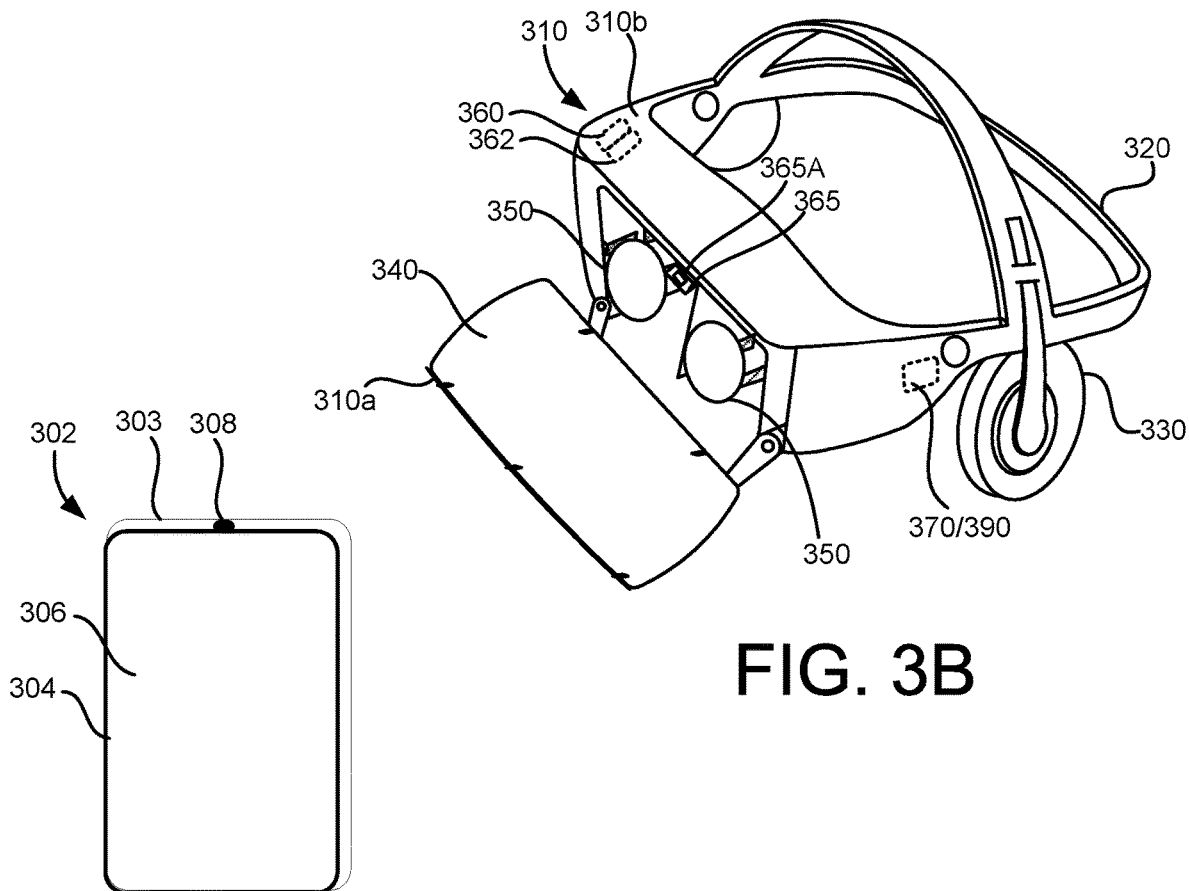
FIG. 3A
FIG. 3B
FIG. 3C

CONTEXT-SENSITIVE HAND INTERACTION

CROSS-REFERENCE TO RELATED APPLICATIONS

This application claims priority to U.S. application Ser. No. 16/100,748, filed on Aug. 10, 2018, which claims priority to U.S. Application No. 62/543,775, filed on Aug. 10, 2017, the disclosures of which are incorporated herein by reference in their entirety.

BACKGROUND

Various types of systems can generate immersive environments for users. For example, a virtual reality (VR) system generates an immersive virtual environment for a user. The immersive virtual environment can be three-dimensional (3D) and can include multiple virtual objects with which the user may interact. As another example, an augmented reality (AR) system generates an immersive augmented environment for a user. The immersive augmented environment can be generated by superimposing computer-generated graphical content, such as images, on a user's field of view of the real world.

The user can experience these immersive environments via various display devices such as, for example, a helmet or other head mounted device including a display, glasses, or goggles that a user looks through when viewing a display device.

The user may interact with the immersive environment in a variety of ways. For example, the user may use hand movements to interact with the immersive environment. The user may also manipulate a controller to interact with the immersive environment.

SUMMARY

This document relates, generally, to context-sensitive hand interaction in an immersive environment rendering. In some implementations, the foveated rendering is smoothly varying.

One aspect is a method comprising: determining a contextual factor for a user; selecting an interaction mode based on the contextual factor; monitoring a hand of the user to determine a hand property; and determining an interaction with an immersive environment based on the interaction mode and the hand property.

Another aspect is a system comprising: at least one processor; and memory storing instructions that, when executed by the at least one processor, cause the system to: determine a contextual factor for a user; select an interaction mode based on the contextual factor; monitor the user's hand to determine a hand property; and determine an interaction with an immersive environment based on the interaction mode and the hand property.

Another aspect is a method comprising: generating an immersive environment that includes a three-dimensional virtual canvas; determining an orientation of a handheld electronic device held in a first hand of a user; based on the orientation of the handheld electronic device indicating the first hand is in a first state, selecting a positional interaction mode; using a hand tracker to determine a position of a second hand of the user; mapping the position of the second hand to a virtual hand position in the immersive environment; generating a visual entity in the three-dimensional virtual canvas based on the virtual hand position; monitoring for a change to the orientation of the handheld electronic device; and responsive to the orientation of the handheld device changing to a changed orientation: determining that the changed orientation indicates the first hand is in a second state; and responsive to determining that the first hand is in the second state, selecting a ray-based collision mode as the interaction mode and generating a virtual ray that extends in a pointing direction from the virtual hand position.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

Figure 1:
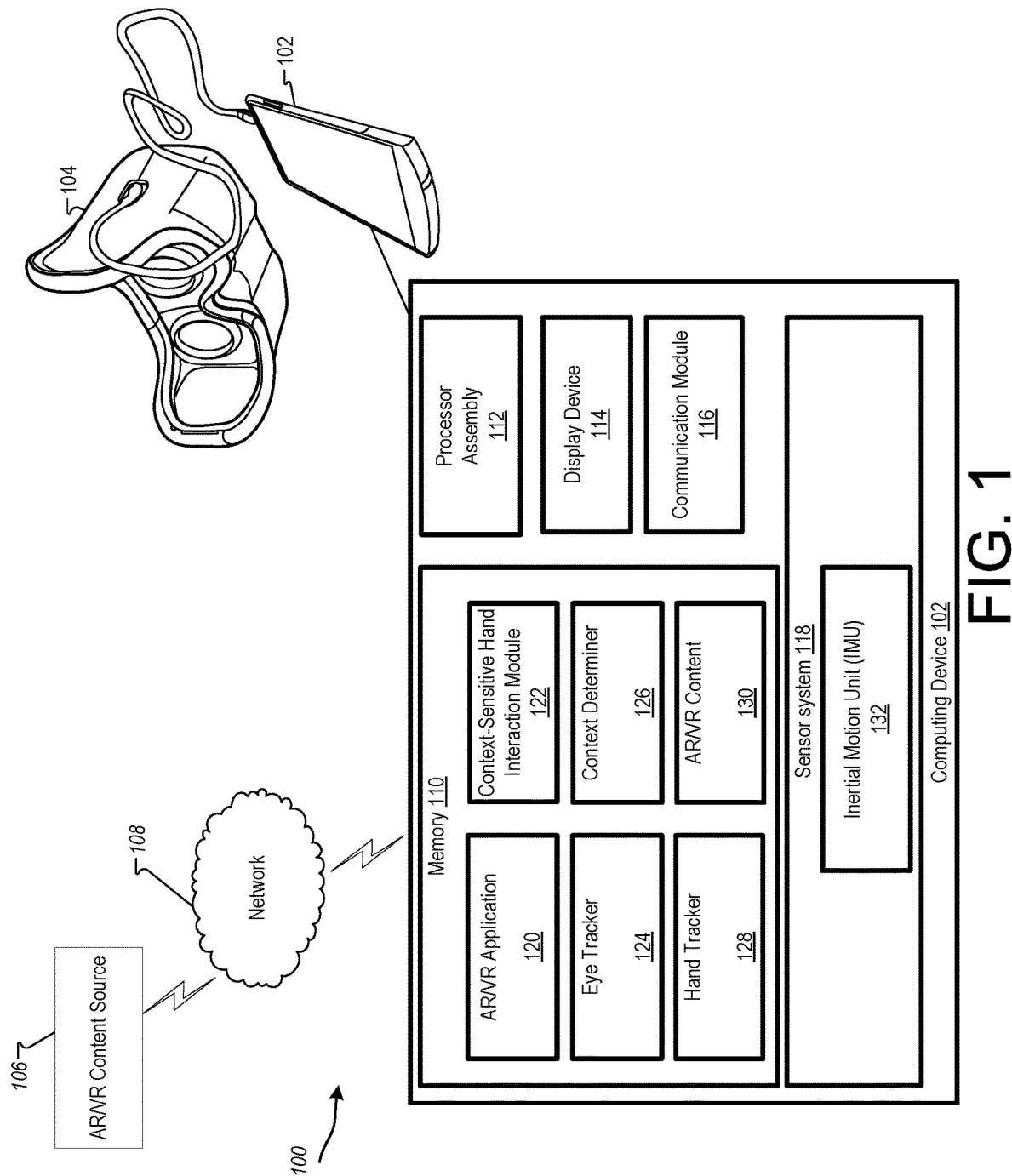
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

At least some implementations of VR systems and AR systems include a head-mounted display device (HMD) that can be worn by a user to generate an immersive environment for the user. Examples of an immersive environment include a VR environment generated by a VR system and an AR environment generated by an AR system. In at least some implementations, the HMD includes a stereoscopic display in which different images and/or videos are shown to each of the user's eyes to convey depth. The HMD may display images that cover some (AR) or all (VR) of a user's field of view. The HMD may also track the movement of the user's head and/or pupil location. As the user's head moves, the HMD may display updated images that correspond to the user's changing orientation and/or position within the AR or VR environment.

Some implementations of VR and/or AR systems include a hand tracker that can track a user's hands. The hand tracker may track one of the user's hands or both of the user's hands. The hand tracker may be a component of the HMD or may be separate from the HMD. In some implementations, the hand tracker performs key point detection to track one or more points of a user's hand, such as finger tips, knuckles, etc.

The hand tracker may determine various hand properties of the user's hand. In some implementations, a hand property may correspond to an action performed by a hand of a user to provide user input to the immersive environment. For example, the hand action may control a virtual entity in the immersive environment or interact with the immersive environment. The hand action may include positioning the hand in a specific place, moving the hand in a specific motion, or arranging the fingers of the hand in a specific configuration.

In some implementations, a hand property is a measurement of one or more of a position, relative position, orientation, relative orientation, motion, or configuration (e.g., arrangement of fingers) of a user's hand. The relative position and relative orientation may be determined with respect to a direction of gravitational force, the position or orientation of an HMD worn by the user, or a position or orientation of a portion of the user's body. In some implementations, a hand property is determined based on measurements of one or more of a position, relative position, orientation, relative orientation, motion, or arrangement of a user's hand. For example, a hand property may be a gesture (e.g., a continuous motion) performed by a user's hand that may be determined based on a sequence of measurements of the position, orientation, motion, and arrangement of the user's hand.

An example hand property is a position of the user's hand. Another example hand property is a pointing direction of a finger of the user. Another example hand property is a position of a finger of the user. Another example hand property is a gesture performed by the hand. Another example hand property is an arrangement (or hand sign/signal) of the user's hand (e.g., the positions and orientations of at least some of the fingers relative to the hand). Another example hand property is a movement of the user's hand from a first position to a second position.

In some implementations, hand properties are determined based on measurements (or sequences of measurements) of the position, motion, orientation, or six-degrees-of-freedom pose of a handheld controller. These measurements may be used to infer one or more of a position, relative position, orientation, relative orientation, motion, or arrangement of a user's hand and, in turn, a hand property.

Some implementations of VR and/or AR systems also determine an interaction mode. In some implementations, the interaction mode defines how user inputs interact with the immersive environment. For example, the interaction mode may define which hand properties are determined and how the hand properties impact the immersive environment. The interaction mode may be stored as variable or setting in the system. Based on the determined interaction mode and the determined hand property, an interaction with the immersive environment is performed. Non-limiting examples of interaction modes include a positional interaction mode, a ray-based collision mode, and a point-based collision mode.

In at least some implementations, the interaction mode is selected based on a contextual factor. For example, the VR or AR system may determine a contextual factor for the user and then select an interaction mode based on the contextual factor.

In some implementations, the contextual factor is a property of the physical environment, the immersive environment, or the user. For example, the contextual factor may be a property of the user's body position, the user's head position, or the user's eye position. In some implementations, the contextual factor is determined based on a position, orientation, or six-degree-of-freedom pose of one or more of handheld controllers or HMDs. The contextual factor may also be a state of a user input control of the system.

In some implementations, the contextual factors include properties of the user in a physical environment, properties of a representation of the user in an immersive environment, or values of settings in the system that a user may be able to modify. In some implementations, a contextual factor is a property of the physical environment, the immersive environment, the application environment, the user, or a representation of the user in the immersive environment. Non-limiting examples of contextual factors include a mode setting, an actuation state of a user-input element, a physical position of a user's hand, a position or orientation of a handheld electronic device, a proximity between the user's hands, a virtual position of the user's hand in the immersive environment, an orientation of the user's head, and a focus point determined based on the user's gaze.

In some implementations, the interaction mode may be selected based on various determined hand properties, such as the pose of the user's hand. The pose may, for example, be a six degrees of freedom pose of the user's hand that includes the position and orientation of the user's hand. For example, the interaction mode may be selected based on the pose of the user's hand and the interaction may be determined based on another hand property, such as the position of the user's hand or a finger of the user's hand.

In one example, the VR or AR system generates an immersive painting environment. For example, the immersive painting environment may allow the user to paint within a three-dimensional canvas volume. In some implementations, the three-dimensional canvas volume occupies a portion of the immersive environment. In other implementations, the three-dimensional canvas volume occupies the entire immersive volume (i.e., the user can paint anywhere). The immersive painting environment may also include a user interface entity through which the user can perform various actions (e.g., cut-and-paste, save the canvas volume, etc.) and adjust various settings, such as paint color, brush type/style, etc.

The VR or AR system may determine an interaction mode for the user within the immersive painting environment based on a contextual factor for a user. For instance, in a first interaction mode that provides for positional interaction, the position of the user's hand may be tracked and mapped to a virtual hand position. Visual entities may then be generated in the immersive environment at the virtual hand positions to, for example, represent paint from a paint brush. The visual entities may include vertices, polygonal meshes, sprites, voxels, and/or point clouds. In a second interaction mode that provides for ray-based collisions, both the position of the user's hand and a pointing direction of a finger of the user's hand may be tracked and used to generate a virtual ray that extends in the pointing direction from the finger of the user's hand in the immersive environment. The VR or AR system may then identify entities in the immersive environment that intersect with the virtual ray. For example, the user may perform an action using the user-interface entity by directing the virtual ray at a portion of the user-interface entity in the immersive environment.

In some implementations, the VR or AR system uses properties of a first hand of the user to interact in the immersive environment (e.g., to generate visual entities or to generate a virtual ray as described above) and determines an interaction mode based on contextual factors determined about a second hand of the user. For example, if the second hand is in an inactive position (e.g., behind the user or at the user's side), the VR or AR system may select the first interaction mode in which the user can paint by generating visual entities in the canvas volume based on the position/movements of the first hand. However, when, the second hand is moved to an active position (e.g., in front of the user, near the first hand, raised), the VR or AR system may switch to the second interaction mode in which a virtual ray is generated from the user's finger in the immersive environment. The position of the second hand may be determined using the hand tracker. Additionally, the position of the second hand may be determined using a handheld electronic device that is held by the user. For example, the handheld electronic device may include an inertial motion unit (IMU) that may be able to determine the orientation, acceleration, and/or motion of the handheld electronic device. The position/orientation of the user's hand may be inferred from one or more of the determined orientation, acceleration, and/or motion of the handheld electronic device.

Additionally, the VR or AR system may switch between the first interaction mode and the second interaction mode based on a user input via a user-input component of the handheld electronic device, such as a button, touchscreen, switch, dial, or other type of user-input component. In some implementations, the VR or AR system switches between interaction modes based on the orientation of the user's head, an action by the user's head (e.g., a head nod), a direction of the user's gaze, or a speech input.

FIG. 1 is a block diagram illustrating a system 100 according to an example implementation. The system 100 generates an immersive environment, such as an AR environment or VR environment, for a user of the system 100. In some implementations, the system 100 includes a computing device 102, a head-mounted display device (HMD) 104, and an AR/VR content source 106. Also shown is a network 108 over which the computing device 102 may communicate with the AR/VR content source 106.

In some implementations, the computing device 102 is a mobile device (e.g., a smart phone) which may be configured to provide or output immersive AR/VR content to a user. The computing device 102 may include a memory 110, a processor assembly 112, a display device 114, a communication module 116, and a sensor system 118. The memory 110 may include an AR/VR application 120, a context-sensitive hand interaction module 122, an eye tracker 124, a context determiner 126, a hand tracker 128, and AR/VR content 130. The computing device 102 may also include various user input components (not shown) such as a handheld electronic device that communicates with the computing device 102 using a wireless communications protocol.

The memory 110 can include one or more non-transitory computer-readable storage media. The memory 110 may store instructions and data that are usable to generate an immersive environment for a user.

The processor assembly 112 includes one or more devices that are capable of executing instructions, such as instructions stored by the memory 110, to perform various tasks, such as generating an immersive environment, determining contextual factors, selecting an interaction mode based on contextual factors, and managing hand-based user interaction. For example, the processor assembly 112 may include a central processing unit (CPU) and/or a graphics processor unit (GPU). For example, if a GPU is present, some image or video rendering tasks associated with generating the immersive environment may be offloaded from the CPU to the GPU.

The display device 114 may, for example, include an LCD (liquid crystal display) screen, an OLED (organic light emitting diode) screen, a touchscreen, or any other screen or display for displaying images or information to a user. In some implementations, the display device 114 includes a light projector arranged to project light onto a portion of a user's eye when the HMD 104 is worn.

The communication module 116 includes one or more devices for communicating with other computing devices, such as the AR/VR content source 106. The communication module 116 may communicate via wireless or wired networks.

The sensor system 118 may include various sensors, including an inertial motion unit (IMU) 132. Implementations of the sensor system 118 may also include different types of sensors, including, for example, a light sensor, an audio sensor, an image sensor, a distance sensor, a proximity sensor, a contact sensor such as a capacitive sensor, a timer, and/or other sensors and/or different combination(s) of sensors.

The IMU 132 detects motion, movement, and/or acceleration of the computing device 102 and/or the HMD 104. The IMU 132 may include various types of sensors such as, for example, an accelerometer, a gyroscope, a magnetometer, and other such sensors. A position and orientation of the HMD 104 may be detected and tracked based on data provided by the sensors included in the IMU 132. The IMU 132 may include various different types of sensors such as, for example, an accelerometer, a gyroscope, a magnetometer, and other such sensors. The detected position and orientation of the HMD 104 may allow the system to detect and track the user's gaze direction and/or head movement.

The AR/VR application 120 may generate and present an immersive environment to a user via one or more output devices of the computing device 102 such as the display device 114, a speaker(s) (not shown), and/or other output devices. In some implementations, the AR/VR application 120 includes instructions stored in the memory 110 that, when executed by the processor assembly 112, cause the processor assembly 112 to perform the operations described herein. For example, the AR/VR application 120 may generate and present an immersive environment to the user based on, for example, AR/VR content, such as the AR/VR content 130 and/or AR/VR content received from the AR/VR content source 106. The AR/VR content 130 may include 3D scenes that can be rendered as images or videos for display on the display device 114. For example, the 3D scene can include one or more objects represented as polygonal meshes. The polygonal meshes may be associated with various surface textures, such as colors and images. The 3D scene may also include other information such as, for example, light sources that are used in rendering the 3D scene.

The AR/VR application 120 may use the context-sensitive hand interaction module 122 to select an interaction mode. In some implementations, the context-sensitive hand interaction module 122 includes instructions stored in the memory 110 that, when executed by the processor assembly 112, cause the processor assembly 112 to perform the operations described herein. The interaction mode may be used to determine how interaction hand properties as interactions within the immersive environment. As described above, non-limiting examples of interaction modes include a positional interaction mode, a ray-based collision mode, and a point-based collision mode. For example, the context-sensitive hand interaction module 122 may determine the interaction mode based on one or more contextual factors determined by the context determiner 126.

The context determiner 126 may determine one or more contextual factors about the user, the immersive environment, and/or the AR/VR application using, for example, the eye tracker 124, the hand tracker 128, the sensor system 118, and/or a handheld electronic device (not shown). Non-limiting examples of contextual factors determined by implementations of the context determiner 126 include a mode chosen by a user, a user input via a user-input component of the handheld electronic device, a position or orientation of at least one of the user's hands in a physical space, a position or orientation of at least one of the user's hands in the immersive environment, an arrangement of the user's hand/s, a speech input, an orientation of the user's head, a movement of the user's head, a direction of the user's gaze, and/or a focus position of the user's gaze within the immersive environment.

In some implementations, the eye tracker 124 includes instructions stored in the memory 110 that, when executed by the processor assembly 112, cause the processor assembly 112 to perform the operations described herein. For example, the eye tracker 124 may determine a location on the display device 114 at which the user's gaze is directed. The eye tracker 124 may make this determination based on identifying and tracking the location of the user's pupils in images captured by an imaging device of the sensor system 118. Based on the identified location of the user's pupils, a gaze direction for the user may be determined and/or a focus position of the user's gaze within the immersive environment.

In some implementations, the hand tracker 128 includes instructions stored in the memory 110 that, when executed by the processor assembly 112, cause the processor assembly 112 to perform the operations described herein. In some implementations, the hand tracker 128 also includes one or more imaging systems, such as visible light cameras or infrared cameras. In some implementations, the hand tracker 128 includes a wearable component such as visible markers, gloves, gesture control armbands, etc. The hand tracker 128 may determine a location in physical space of one or more key points on one or both of the user's hands. For example, a virtual position and orientation of the user's hand in the immersive environment may then be determined.

The AR/VR application 120 may update the AR/VR environment based on input received from the IMU 132 and/or other components of the sensor system 118. For example, the IMU 132 may detect motion, movement, and/or acceleration of the computing device 102 and/or the display device 114. A position and orientation of the HMD 104 may be detected and tracked based on data provided by the sensors included in the IMU 132. The detected position and orientation of the HMD 104 may allow the system to, in turn, detect and track the user's gaze direction and head movement. Based on the detected gaze direction and head movement, the AR/VR application 120 may update the AR/VR environment to reflect a changed orientation and/or position of the user within the environment.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit audio and video signals to the HMD 104 for display for the user, and the HMD 104 may transmit motion, position, and/or orientation information to the computing device 102. In some implementations, the HMD 104 includes a chamber in which the computing device 102 may be placed. In some implementations, the user is able to view the display device 114 of the computing device 102 while wearing the HMD 104 (e.g., through lenses or apertures within the HMD 104). For example, the computing device 102 and the HMD 104 can together function as a stereoscopic viewer by partitioning a screen of the display device 114 into a first image that is viewable by only the left eye of the user when viewed through the HMD and a second image that is viewable by only the right eye of the user when viewed through the HMD.

The AR/VR content source 106 may generate and output AR/VR content, which may be distributed or sent to one or more computing devices, such as the computing device 102, via the network 108. In an example implementation, the AR/VR content includes three-dimensional scenes and/or images. Additionally, the AR/VR content may include audio/video signals that are streamed or distributed to one or more computing devices. The AR/VR content may also include an AR/VR application that runs on the computing device 102 to generate 3D scenes, audio signals, and/or video signals and to process hand interactions with an immersive environment. According to an illustrative example implementation, virtual reality (VR) may generate an immersive environment by, at least in some cases, replicating or simulating, to varying degrees, an environment or physical presence in places in the real world or imagined worlds or environments. Augmented reality (AR) may generate an immersive environment by, at least in some cases, overlaying computer generated graphical content, such as images, on a user's field of view of the real world.

The network 108 may be the Internet, a local area network (LAN), a wireless local area network (WLAN), and/or any other network. The computing device 102, for example, may receive the audio/video signals via the network 108, which may be provided as part of VR content in an illustrative example implementation.

Figure 2:
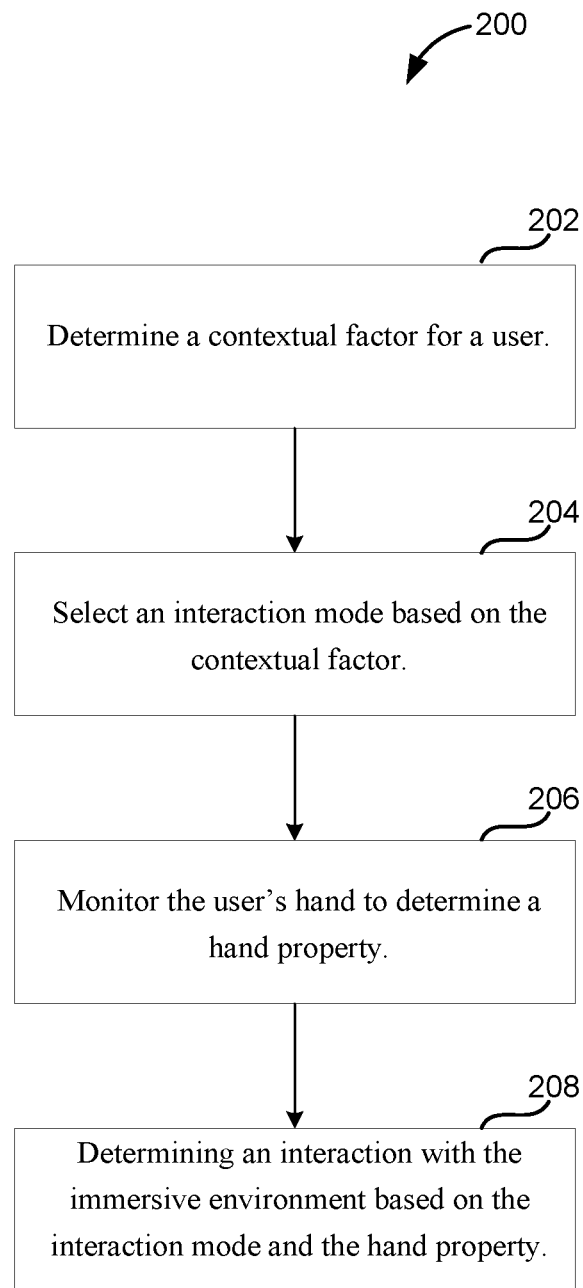
FIG. 2 is a flowchart of an example method of providing context-sensitive hand interaction, in accordance with implementations as described herein.

FIG. 2 is a flowchart of an example method 200 of providing for context-based hand interaction. For example, the method 200 may be performed by implementations of the context-sensitive hand interaction module 122 to generate interactions within an immersive environment generated by the AR/VR application 120.

At operation 202, a contextual factor is determined for a user. In some implementations, multiple contextual factors are determined for the user. The contextual factors may be determined by, for example, the context determiner 126. At least some of the contextual factors may be determined, at least in part, using the eye tracker 124 and/or the hand tracker 128. In some implementations, contextual factors are determined from head motions and/or speech inputs.

At operation 204, an interaction mode is selected based on the contextual factor. In some implementations, the interaction mode is selected based on multiple contextual factors. The interaction mode can, for example, control how hand properties, such as positions, orientations, arrangements, poses, gestures, and motions, are converted to interactions within the immersive environment. Non-limiting examples of interaction modes include a positional interaction mode, a ray-based collision mode, and a point-based collision mode.

At operation 206, the user's hand is monitored to determine a hand property. In some implementations, multiple hand properties are determined. The hand properties may be determined using the hand tracker 128. Additionally, different hand properties may be determined based on the interaction mode determined at operation 204. In some implementations, a pointing direction of a finger of the user's hand may be determined only when in the ray-based collision mode in some implementations. In this manner, fewer processor cycles may be used when in the other interaction modes because the pointing direction is not determined. However, in some implementations, the same hand properties are determined in multiple interaction modes.

At operation 208, an interaction is determined with the immersive environment based on the interaction mode determined at operation 204 and the hand property determined at operation 206. For example, a visual entity (e.g., to represent an artistic stroke with a paintbrush) may be generated in some interaction modes. While in other interaction modes, a user interface element may be actuated to select a menu option or adjust the value of a setting.

FIGS. 3A and 3B are perspective views of an example HMD 300, such as, for example, the HMD 104 of FIG. 1, and FIG. 3C illustrates an example handheld electronic device 302 that is usable with the HMD 300.

The handheld electronic device 302 may include a housing 303 in which internal components of the handheld electronic device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310a of the housing 310 is rotated away from a base portion 310b of the housing 310 so that some of the components received in the housing 310 are visible. A display 340 may be mounted on an interior facing side of the front portion 310a of the housing 310. In some implementations, the display 340 is a display device from a computing device, such as the computing device 102 of FIG. 1, that is inserted and secured between the front portion 310a and the base portion 310b.

Lenses 350 may be mounted in the housing 310, between the user's eyes and the display 340 when the front portion 310a is in the closed position against the base portion 310b of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 or multiple cameras to capture still and moving images. The images captured by the camera 380 may be used to help track a physical position of the user, the user's hand or hands, and/or the handheld electronic device 302 in the real world, or physical environment relative to the immersive environment, and/or may be displayed to the user on the display 340 in a pass-through mode, allowing the generation of an augmented reality environment that includes a combination of images from the real world and computer generated imagery. In some implementations, the pass-through mode is used to allow the user to temporarily leave the immersive environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 including various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to, in turn, detect and track the user's head gaze direction and movement.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes, for example, a particular portion of the user's eyes, such as, for example, the pupil, to detect, and track direction and movement of, the user's gaze. In some implementations, the HMD 300 may be configured so that the detected gaze is processed as a user input to be translated into a corresponding interaction in the AR experience or the immersive VR experience. In some implementations, the HMD 300 is configured to use the detected gaze of the user to determine a focus point in the immersive environment, which can then be used to determine an interaction mode.

Figure 4:
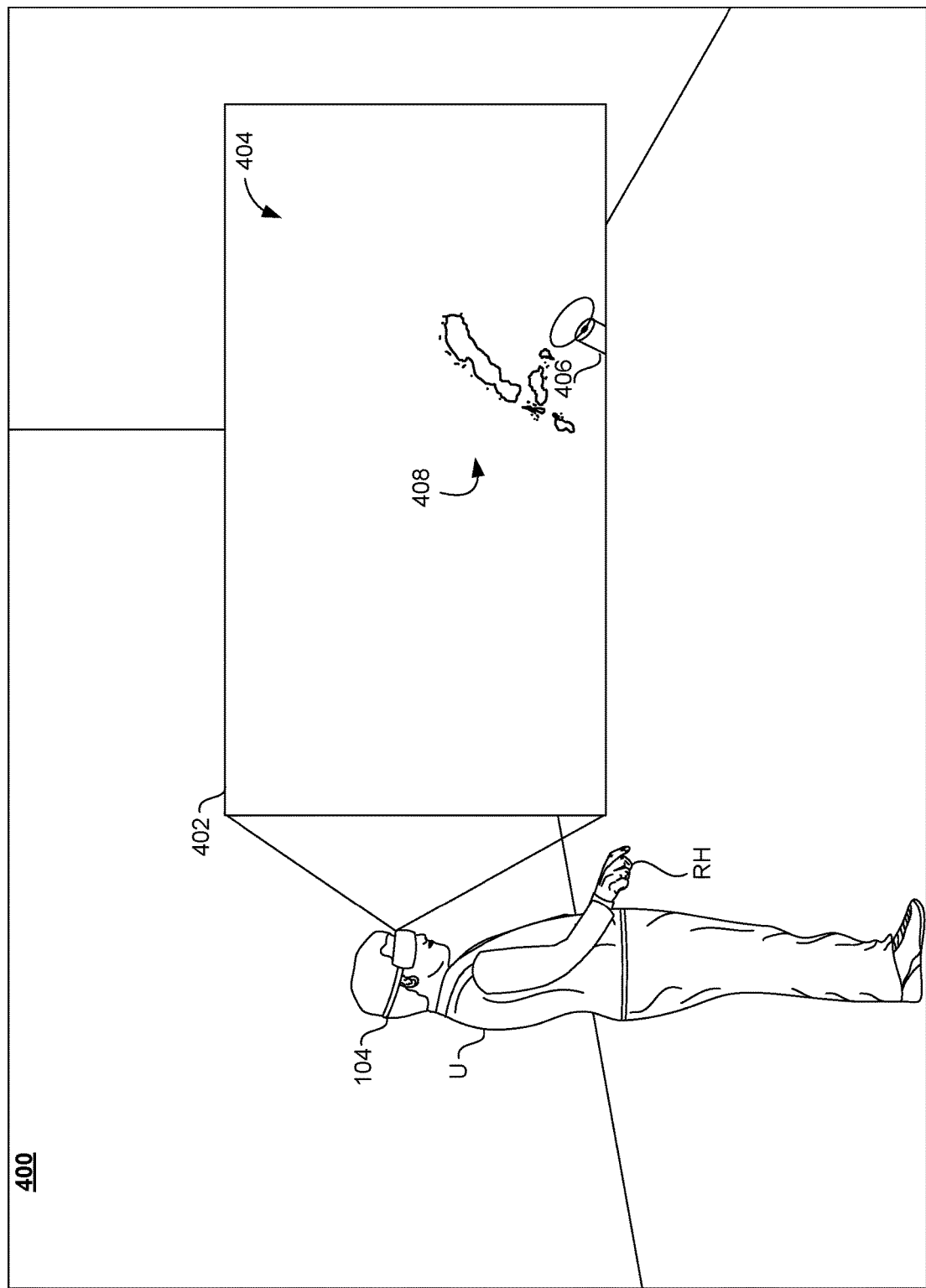
FIG. 4 is a third-person view of a physical space in which a user is experiencing an immersive environment through the HMD of FIG. 1.

FIG. 4 is a third-person view of a physical space 400, in which a user U is experiencing an immersive environment 402 through the HMD 104. In this example, the computing device 102 is disposed within the HMD 104 so that the user can see the display device 114 while wearing the HMD 104. The immersive environment 402 is generated by the computing device 102 and displayed on the display device 114 of the computing device 102.

In this example, the immersive environment 402 provided by the AR/VR application 120 is an immersive painting environment. The immersive environment 402 includes a three-dimensional canvas volume in which the user U can virtually paint.

As shown in the figure, an interaction mode is selected based on contextual factors of the user. In this case, the position of a handheld electronic device 302 in the user's left hand (not shown) is determined as a contextual factor and used to select the interaction mode. Because the left hand is down at the user's side, a positional interaction mode is selected.

In this example positional interaction mode, a position of the user's right hand (RH) is tracked in the real world using, for example, the hand tracker 128. A corresponding virtual position for a virtual paint brush entity 406 within the immersive environment 402 is determined. As the user's right hand moves around, the virtual paint brush entity 406 moves in a corresponding manner within the immersive environment 402 and visual entities 408 are added to the canvas 404 to represent the user's paint strokes. Although the examples herein often relate to painting and may include a virtual paint brush entity, other implementations relate to other activities or applications and may include other types of virtual entities that are controlled by a user.

Figure 5:
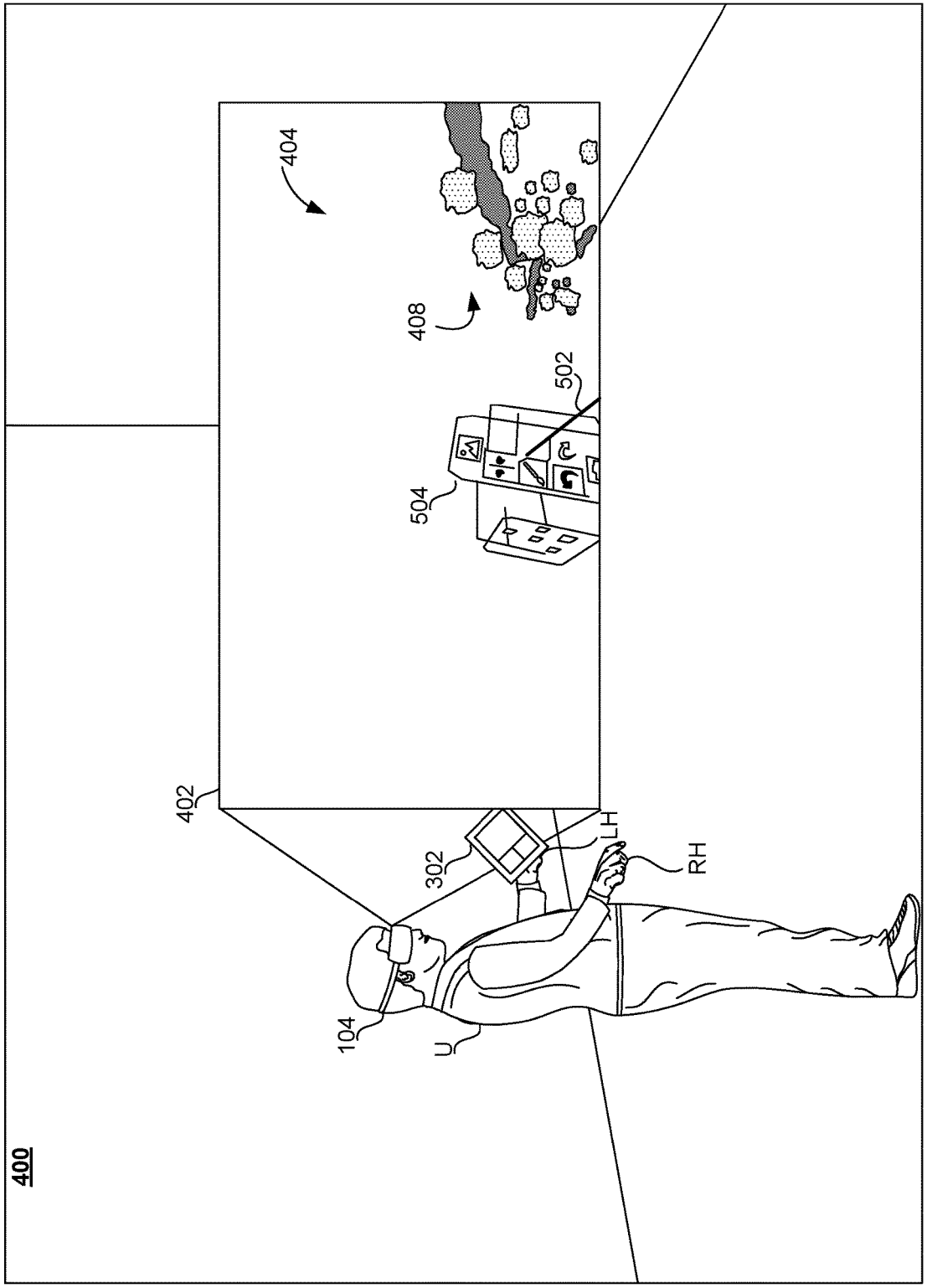
FIG. 5 is another third-person view of the physical space of FIG. 4 in which the user is experiencing the immersive environment of FIG. 4.

FIG. 5 is a third-person view of the physical space 400 of FIG. 4, in which the user U is experiencing the immersive environment 402 through the HMD 104. In FIG. 5, the user U continues to interact with an immersive painting environment. However, in this example, the user U is now holding the handheld electronic device 302 up in front of the user. The position of the handheld electronic device 302 causes the computing device 102 to select a ray-based intersection mode as the interaction mode. In this example, multiple hand properties are determined in the ray-based intersection mode. First, the position of the user's right hand (RH) is determined and mapped to a virtual hand position in the immersive environment 402. Additionally, because the ray-based intersection mode has been selected, a pointing direction of a finger of the user's right hand is determined. A virtual ray 502 is generated within the immersive environment 402 extending in the determined pointing direction from the virtual hand position. As the user's hand moves in the physical world, the virtual ray 502 will move in the immersive environment 402 allowing the user to point to and interact with various user interface elements of a user interface entity 504. In some implementations, the user interface entity 504 is a virtual entity that is displayed in the immersive environment 402 based on a determined interaction mode, when the user performs a specific action (e.g., holding up the handheld electronic device 302), or when the user orients toward a specific position in the immersive environment 402.

Figure 6:
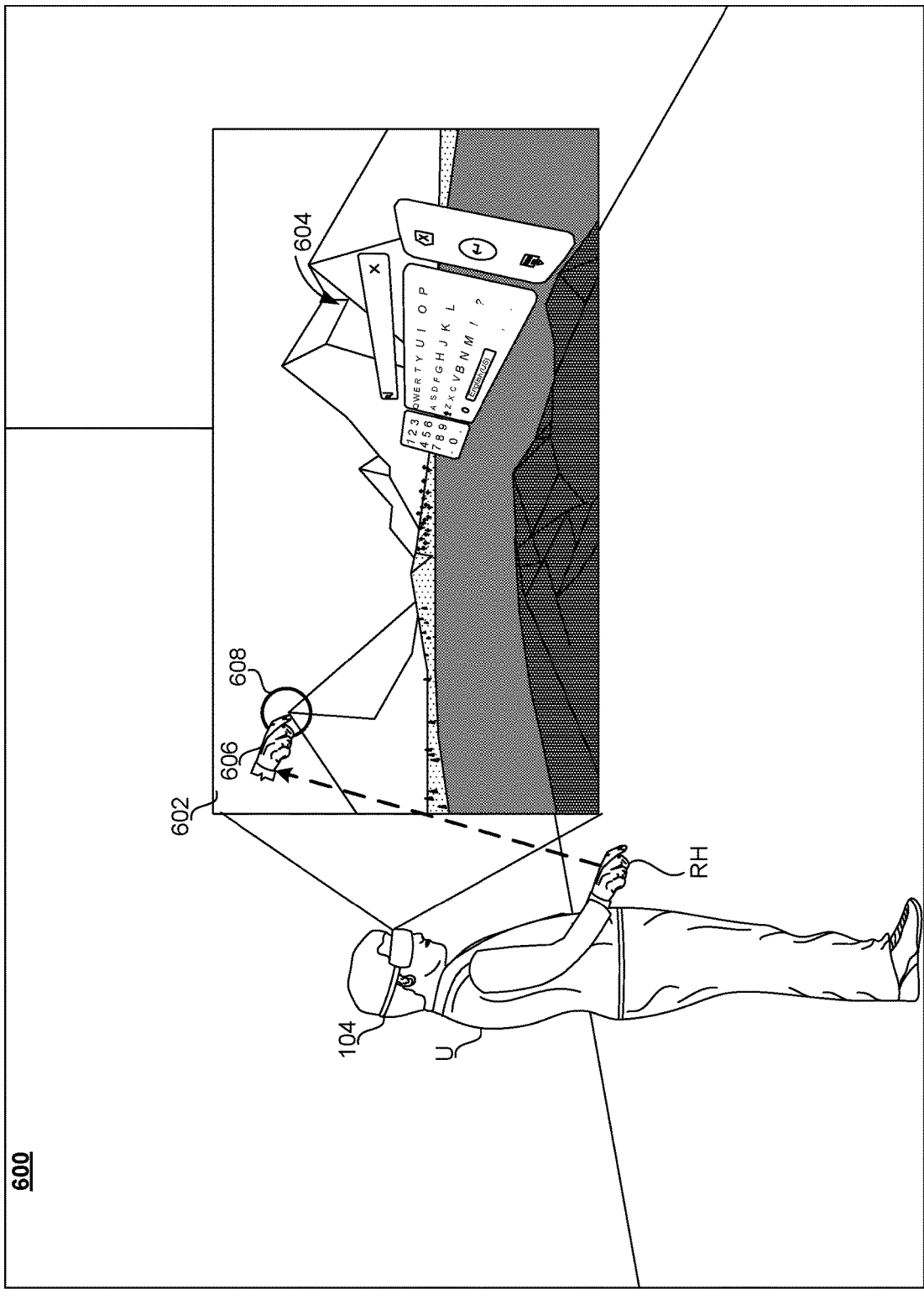
FIG. 6 is a third-person view of a physical space in which a user is experiencing an immersive environment through the HMD of FIG. 1.

FIG. 6 is a third-person view of a physical space 600, in which a user U is experiencing an immersive environment 602 through the HMD 104. In this example, the computing device 102 is disposed within the HMD 104 so that the user can see the display device 114 while wearing the HMD 104. The immersive environment 602 is generated by the computing device 102 and displayed on the display device 114 of the computing device 102.

In this example, the immersive environment 602 provided by the AR/VR application 120 is an immersive nature scene and includes a virtual keyboard 604. The immersive nature scene may include various natural entities with which the user U can interact.

As shown in the figure, an interaction mode is selected based on contextual factors of the user. In this case, a virtual hand position 606 of the user's right hand (RH) is used to select an interaction mode. For example, based on the distance between the virtual hand position 606 and the position of the virtual keyboard 604 exceeding a threshold, a point-based collision mode is selected as the interaction mode. In the point-based collision mode, a region 608 around a point of the virtual hand position 606 is used for interactions with entities in the immersive environment. For example, if an entity from the immersive environment 602 (e.g., the peak of the mountain) is within the region 608, an interaction with that entity may occur. As the user's right hand moves around in the physical space 600, the virtual hand position 606 will move around correspondingly in the immersive environment 602.

Figure 7:
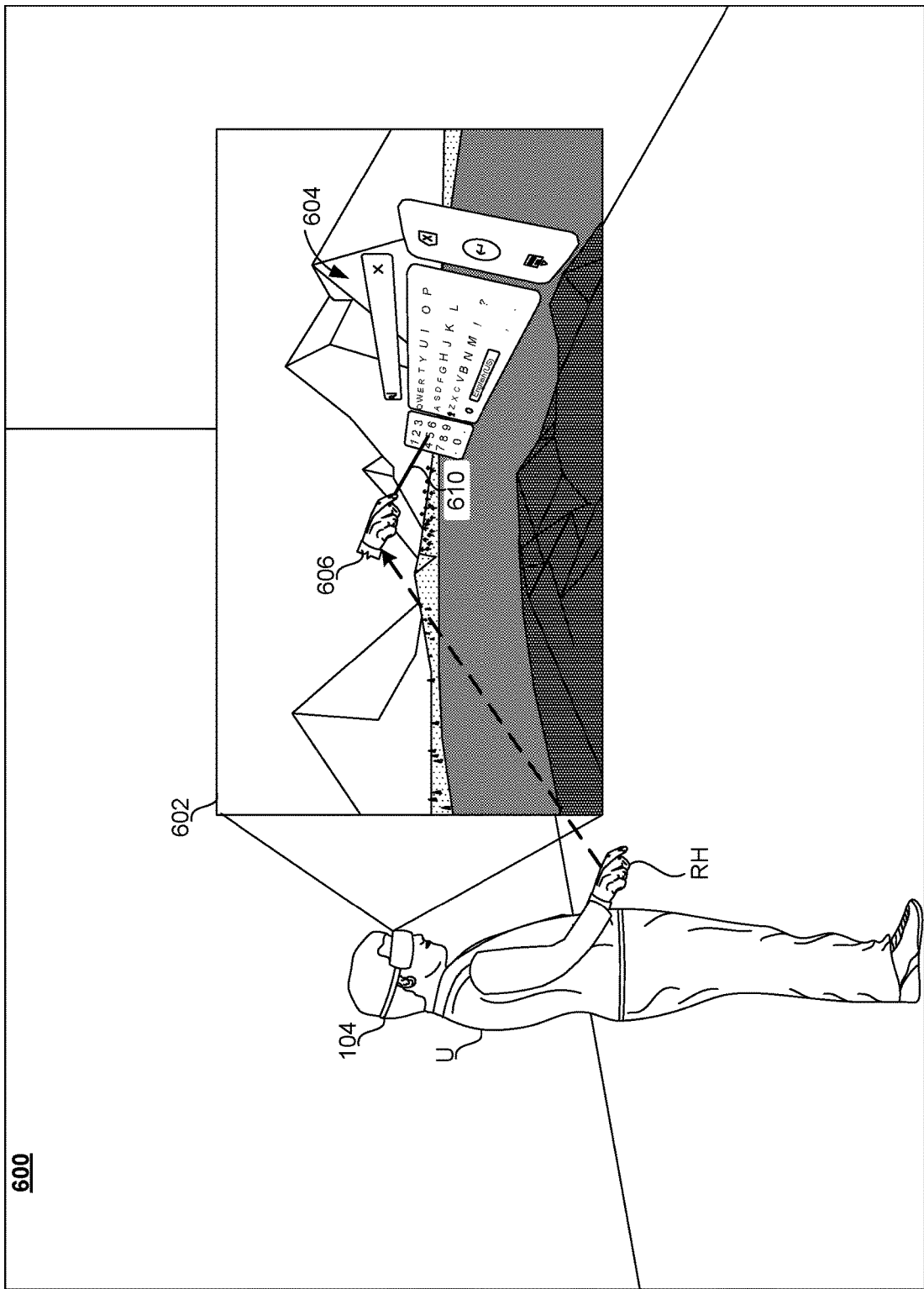
FIG. 7 is another third-person view of the physical space of FIG. 6 in which the user is experiencing the immersive environment of FIG. 6.

FIG. 7 is a third-person view of the physical space 600 of FIG. 6, in which the user U is experiencing the immersive environment 602 through the HMD 104. In FIG. 7, the user U continues to interact within the immersive nature scene. However, in this example, the right hand of the user U has moved so as to cause the virtual hand position 606 to be positioned closer to the virtual keyboard 604. For example, based on the distance between the virtual hand position 606 and the position of the virtual keyboard 604 being within a threshold, a ray-based collision mode is selected as the interaction mode. In the ray-based collision mode, a virtual ray 610 extends from the virtual hand position 606 toward the virtual keyboard 604. Beneficially, the ray-based collision mode may be more intuitive for the user U to interact with a user-interface entity such as the virtual keyboard 604.

Figure 8:
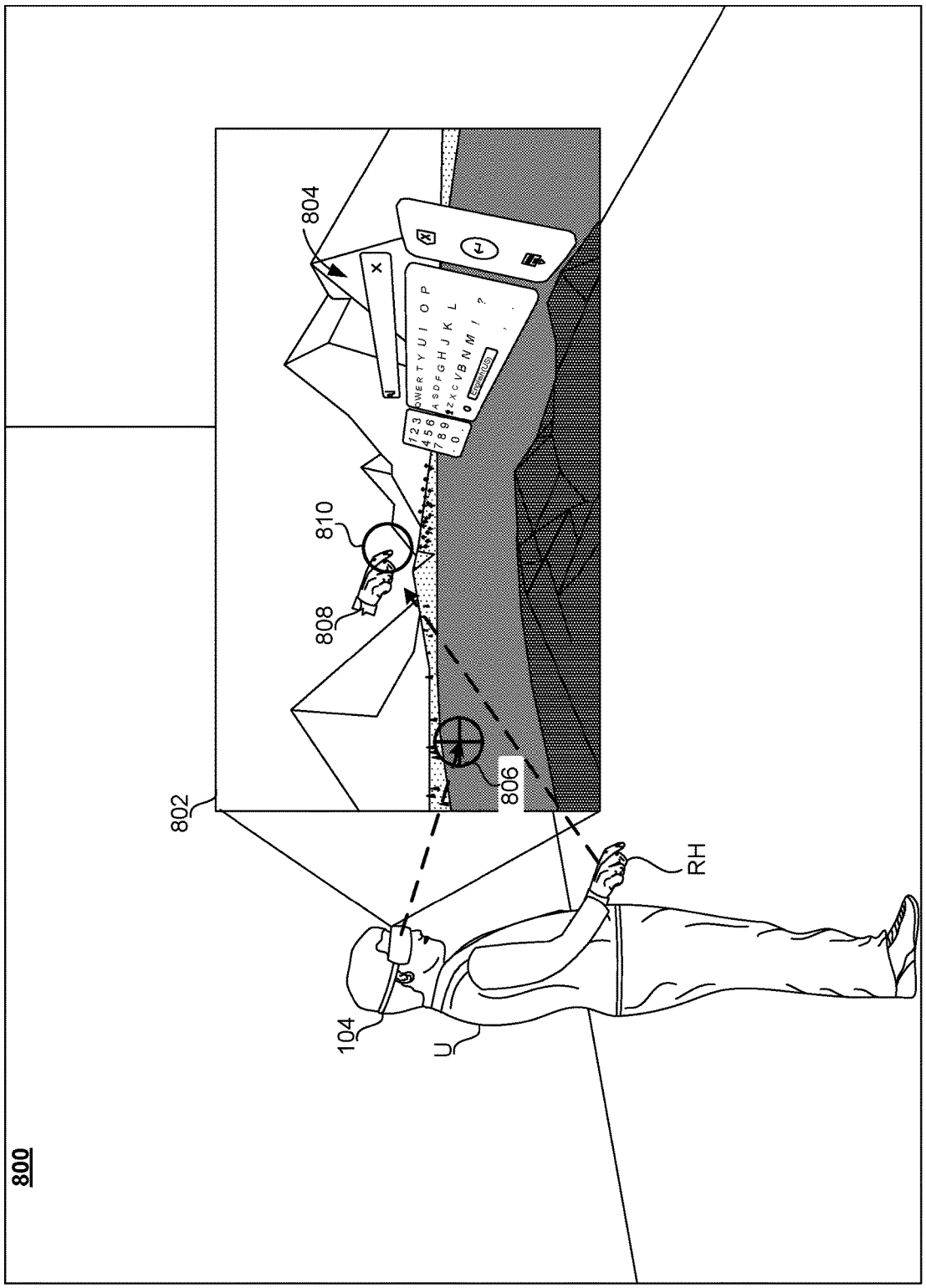
FIGS. 8 and 9 show third-person views of a physical space in which a user is experiencing an immersive environment through the HMD of FIG. 1.
Figure 9:
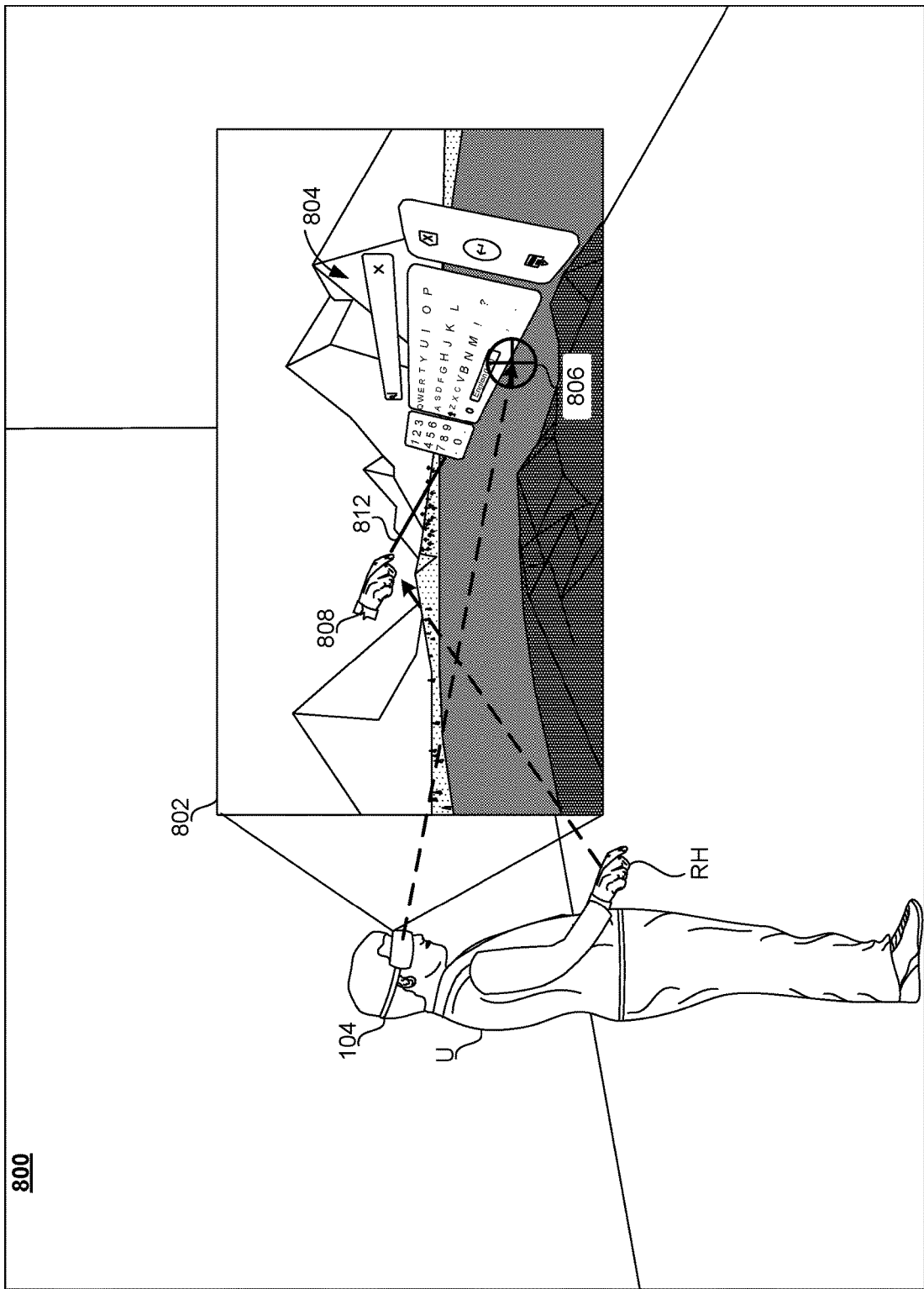

FIGS. 8 and 9 show third-person views of a physical space 800, in which a user U is experiencing an immersive environment 802 through the HMD 104. In this example, the computing device 102 is disposed within the HMD 104 so that the user can see the display device 114 while wearing the HMD 104. The immersive environment 802 is generated by the computing device 102 and displayed on the display device 114 of the computing device 102.

In this example, the immersive environment 802 provided by the AR/VR application 120 is an immersive nature scene and includes a virtual keyboard 804. The immersive nature scene may include various natural entities with which the user U can interact. FIGS. 8 and 9 are similar to the examples of FIGS. 6 and 7 except that the interaction mode is selected based on a focus position in the immersive environment 802 rather than a virtual hand position.

As shown in FIG. 8, the interaction mode is selected based on contextual factors of the user. In this case, a focus position 806 within the immersive environment 802 is determined based on the user's gaze direction as determined by, for example, the eye tracker 124. For example, based on the distance between the focus position 806 and the position of the virtual keyboard 804 exceeding a threshold, a point-based collision mode is selected as the interaction mode. As described previously in the point-based collision mode, a virtual hand position 808 is determined from the position and/or movement of the user's right hand (RH) in the physical space 800. In some implementations, a region 810 around a point of the virtual hand position 808 is then used for interactions with entities in the immersive environment.

As shown in FIG. 9, the user U continues to interact within the immersive nature scene of the immersive environment 802. However, in this figure, the user's gaze has shifted and the focus position 806 is closer to the virtual keyboard 804. In some implementations, based on the distance between the focus position 806 and the position of the virtual keyboard 804 being within a threshold, a ray-based collision mode is selected as the interaction mode. In the ray-based collision mode, a virtual ray 812 extends from the virtual hand position 808 toward the virtual keyboard 804. As described before, the ray-based collision mode may be more intuitive for the user U to interact with a user-interface entity such as the virtual keyboard 804.

Figure 10:
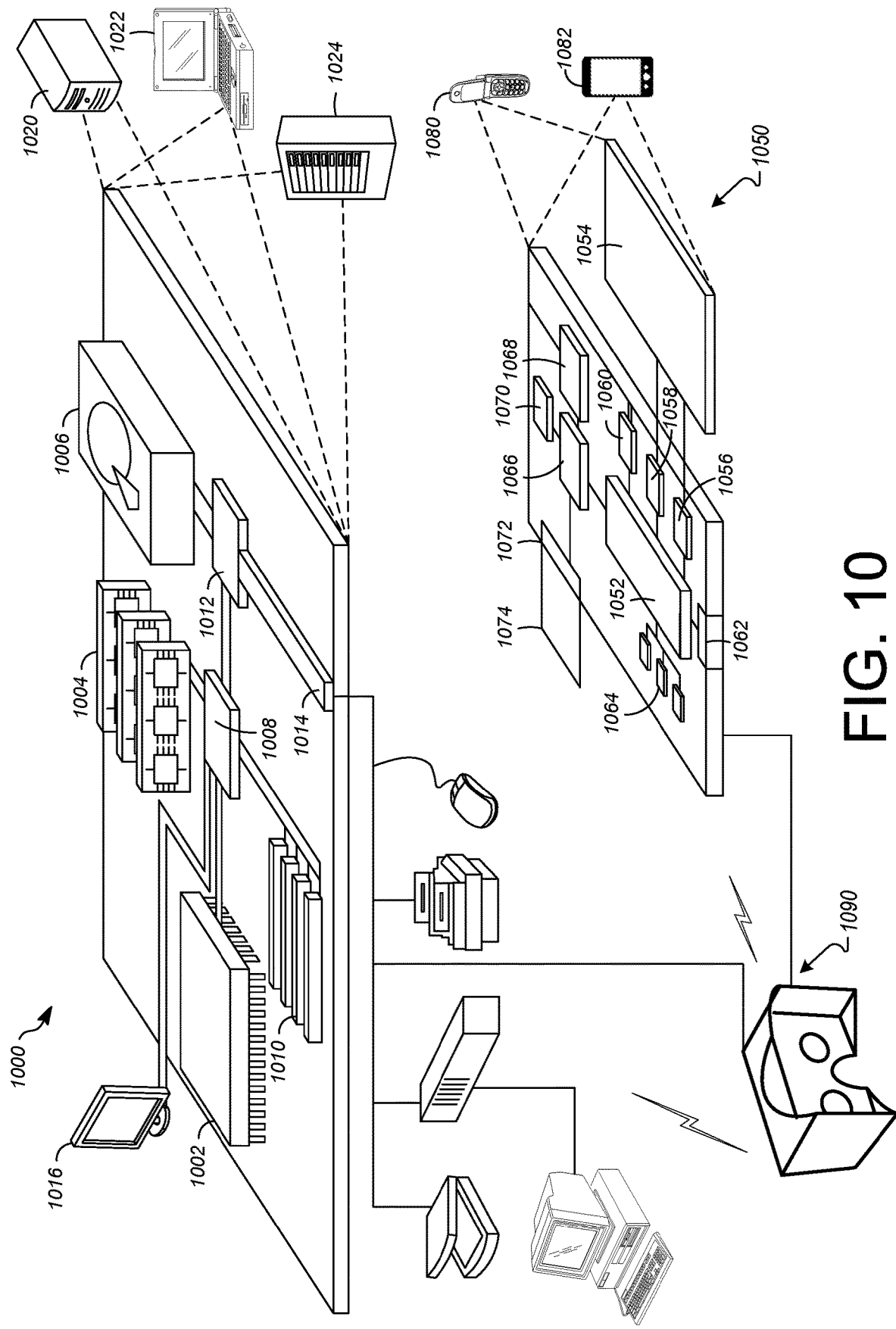
FIG. 10 shows an example of a computer device and a mobile computer device that can be used to implement the techniques described herein.

FIG. 10 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1020 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1020, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1020. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1020 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be implemented in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, applications, apps, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an LCD (liquid crystal display) screen, an OLED (organic light emitting diode)) for displaying information to the user and a keyboard, touch-screen, and a pointing device (e.g., a touchpad, mouse, or trackball) by which the user can provide input to the computer. Additionally, the user can provide input via hand or body actions, arrangements, poses, or gestures. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middle-ware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 1 can include sensors that interface with a virtual reality (VR headset/HMD device 1090) to generate an AR or VR environment with context-based hand interactions to improve the interface between the user and the immersive environment and to reduce the number of processor cycles required to provide the immersive environment, increase framerate, and/or reduce the processor cycles required for rendering. For example, one or more sensors included on a computing device 1020 or other computing device depicted in FIG. 1, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1020 can use the sensors to determine an absolute position and/or a detected rotation of the computing device in the VR space that can then be used as input to the VR space. For example, the computing device 1020 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connected to, the computing device 1020 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1020 when the computing device is incorporated into the VR space can cause a particular action to occur in the VR space.

In some implementations, a touchscreen of the computing device 1020 can be rendered as a touchpad in VR space. A user can interact with the touchscreen of the computing device 1020. The interactions are rendered, in the VR headset 1090 for example, as movements on the rendered touchpad in the VR space. The rendered movements can control virtual objects in the VR space.

In some implementations, one or more output devices included on the computing device 1020 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1020 may appear as another object in a computer-generated, 3D immersive environment. Interactions by the user with the computing device 1020 (e.g., rotating, shaking, touching a touchscreen, swiping a finger across a touch screen) can be interpreted as interactions with the object in the VR space. In the example of the laser pointer in a VR space, the computing device 1020 appears as a virtual laser pointer in the computer-generated, 3D environment. As the user manipulates the computing device 1020, the user in the VR space sees movement of the laser pointer. The user receives feedback from interactions with the computing device 1020 in the VR environment on the computing device 1020 or on the VR headset 1090.

In some implementations, a computing device 1020 may include a touchscreen. For example, a user can interact with the touchscreen in a particular manner that causes the system to mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a n immersive environment such as a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1020 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In the following some examples are given.

Example 1: A method for context-sensitive hand interaction with an immersive environment comprising: determining a contextual factor for a user; selecting an interaction mode based on the contextual factor; monitoring a hand of the user to determine a hand property; and determining an interaction with an immersive environment based on the interaction mode and the hand property.

Example 2: The method of example 1, wherein the monitoring the hand of the user to determine a hand property includes monitoring the hand to determine a pointing direction of a finger of the user's hand.

Example 3: The method of example 2, wherein the interaction mode is a ray-based collision mode and the method further includes generating a virtual ray that extends in the pointing direction from the finger of the user.

Example 4: The method of any preceding example, wherein the monitoring the hand of the user to determine a hand property includes monitoring the hand to determine a position of a finger of the hand.

Example 5: The method of example 4, wherein the interaction mode is a point-based collision mode and the method further includes generating a collision point based on the position of the finger of the hand.

Example 6: The method of any preceding example, wherein the monitoring the hand of the user to determine a hand property includes monitoring the user's hand to determine a gesture performed by the hand.

Example 7: The method of any preceding example, wherein the monitoring the hand of the user to determine a hand property includes monitoring the user's hand to determine a movement of the hand from a first position to a second position.

Example 8: The method of any preceding example, wherein the contextual factor is a mode selection and the determining the contextual factor for the user includes: presenting a user interface that includes a plurality of user-selectable interface elements, each of the plurality of user-selecting interface elements being associated with a mode; receiving a selection from the user of one of the user-selectable interface elements; and determining the contextual factor for the user to be the mode associated with the selected user-selectable interface element.

Example 9: The method of any preceding example, wherein the contextual factor is a distance and the determining the contextual factor for the user includes: determining a position of the user's hand; mapping the position of the user's hand to a virtual hand position in the immersive environment; and determining a distance from the virtual hand position to a user-interface entity in the immersive environment.

Example 10: The method of example 9, wherein the selecting an interaction mode based on the contextual factor includes: comparing the distance to a threshold distance; responsive to determining that the distance is not greater than the threshold distance, selecting a ray-based collision mode as the interaction mode; and responsive to determining that the distance is greater than the threshold distance, selecting a point-based collision mode as the interaction mode.

Example 11: The method of any preceding example, wherein the contextual factor is a focus position in the immersive environment and the determining the contextual factor for the user includes: tracking a gaze of the user; and determining the focus position based on the gaze.

Example 12: The method of example 11, wherein the selecting an interaction mode based on the contextual factor includes: identifying an entity in the immersive environment associated with the focus position; responsive to determining that the identified entity is a user-interface entity, selecting a ray-based collision mode as the interaction mode; and responsive to determining that the identified entity is not a user-interface entity, selecting a point-based collision mode as the interaction mode.

Example 13: The method of any preceding example, wherein determining a contextual factor for the user includes determining a pose or an arrangement of the user's hand.

Example 14: The method of any preceding example, wherein the immersive environment is an augmented reality environment.

Example 15: The method of any preceding example, wherein the immersive environment is a virtual reality environment.

Example 16: A system for context-sensitive hand interaction with an immersive environment comprising: at least one processor; and memory storing instructions that, when executed by the at least one processor, cause the system to: determine a contextual factor for a user; select an interaction mode based on the contextual factor; monitor the hand of the user hand to determine a hand property; and determine an interaction with an immersive environment based on the interaction mode and the hand property.

Example 17: The system of example 16, further including a hand tracker, wherein the instructions, when executed by the at least one processor, further cause the system to: determine a position of the hand using the hand tracker; map the position of the hand to a virtual hand position in the immersive environment; and determine a distance from the virtual hand position to a user-interface entity in the immersive environment.

Example 18: The system of example 17, wherein the instructions that cause the system to select an interaction mode based on the contextual factor include instructions that, when executed by the at least one processor, cause the system to: compare the distance to a threshold distance; responsive to determining that the distance is not greater than the threshold distance, select a ray-based collision mode as the interaction mode; and responsive to determining that the distance is greater than the threshold distance, select a point-based collision mode as the interaction mode.

Example 19: The method of example 1, comprising: generating an immersive environment that includes a three-dimensional virtual canvas; wherein determining a contextual factor for a user comprises determining an orientation of a handheld electronic device held in a first hand of a user; wherein selecting an interaction mode based on the contextual factor comprises selecting based on the orientation of the handheld electronic device indicating the first hand is in a first state, a positional interaction mode; wherein monitoring a hand of the user to determine a hand property comprises using a hand tracker to monitor a position of a second hand of the user; wherein determining an interaction with an immersive environment based on the interaction mode and the hand property comprises mapping the position of the second hand to a virtual hand position in the immersive environment; the method further comprising: generating a visual entity in the three-dimensional virtual canvas based on the virtual hand position; monitoring for a change to the orientation of the handheld electronic device; and responsive to the orientation of the handheld device changing to a changed orientation: determining that the changed orientation indicates the first hand is in a second state; and responsive to determining that the first hand is in the second state, selecting a ray-based collision mode as the interaction mode and generating a virtual ray that extends in a pointing direction from the virtual hand position.

Example 20: The method of example 19, wherein the first state of the first hand is down by a side of the user.

Example 21: The method of example 19 or example 20, wherein the second state of the first hand is in front of the user.

Example 22: The method of any one of examples 19 to 21, further comprising determining an orientation of a finger of the user; and determining the pointing direction based on the orientation of the finger.

Example 23: A method comprising: presenting a user interface that includes a plurality of user-selectable interface elements, each of the plurality of user-selecting interface elements being associated with an interaction mode; receiving a selection from the user of one of the user-selectable interface elements; monitoring a user's hand to determine a hand property; and determining an interaction with an immersive environment based on the hand property and the interaction mode associated with the selected user-selectable interface element.

Example 24: A method comprising: generating an immersive environment; using a hand tracker to determine a position of a user's hand; mapping the position of the user's hand to a virtual hand position in the immersive environment; determining a distance from the virtual hand position to a user-interface entity in the immersive environment comparing the distance to a threshold distance; responsive to determining that the distance is not greater than the threshold distance: determining a pointing direction of a finger of the user's hand; generating a virtual ray in the immersive environment that extends in the pointing direction from the virtual hand position; and actuating a user-interface element of the user-interface entity based on an intersection of the virtual ray with the user-interface element; responsive to determining that the distance is greater than the threshold distance: determining a position of the finger of the user's hand; and interacting with the immersive environment based on the position of the user's finger relative to the virtual hand position.

Example 25: A method comprising: generating an immersive environment; using an eye tracker to track a user's gaze; determining a focus position based on the user's gaze; identifying an entity in the immersive environment associated with the focus position; responsive to determining that the identified entity is a user-interface entity, selecting a ray-based collision mode and generating a virtual ray that extends in a pointing direction based on an orientation of a finger of the user's hand; and responsive to determining that the identified entity is not a user-interface entity, selecting a point-based collision mode and generating a collision point based on a position of the finger of the user's hand.

Example 26: A method comprising: generating an immersive environment that includes a three-dimensional virtual canvas; determining an orientation of a handheld electronic device held in a first hand of a user; based on the orientation of the handheld electronic device indicating the first hand is in a first state, selecting a positional interaction mode; using a hand tracker to determine a position of a second hand of the user; mapping the position of the second hand to a virtual hand position in the immersive environment; generating a visual entity in the three-dimensional virtual canvas based on the virtual hand position; monitoring for a change to the orientation of the handheld electronic device; and responsive to the orientation of the handheld device changing to a changed orientation: determining that the changed orientation indicates the first hand is in a second state; and responsive to determining that the first hand is in the second state, selecting a ray-based collision mode as the interaction mode and generating a virtual ray that extends in a pointing direction from the virtual hand position.

Example 27: The method of example 26, wherein the first state of the first hand is down by a side of the user.

Example 28: The method of example 26 or example 27, wherein the second state of the first hand is in front of the user.

Example 29: The method of any one of examples 26 to 28, further comprising determining an orientation of a finger of the user; and determining the pointing direction based on the orientation of the finger.

What is claimed is:

1. A computer-implemented method, comprising:
    generating an augmented reality (AR) environment, viewable in a head-mounted display device (HMD);
    monitoring a hand of a user of the HMD;
    determining a first hand property based on the monitoring, the first hand property including a pointing direction of the hand;
    determining a collision point with a virtual element in the AR environment based on the pointing direction of the hand; and
    selecting an interaction mode, of a plurality of interaction modes, for interacting with the virtual element, including:
        detecting a virtual distance between a virtual position of the hand of the user and the virtual element;
        selecting a first interaction mode in response to a determination that the virtual distance is less than or equal to a threshold virtual distance, the first interaction mode being a ray-based collision mode, including generating a virtual ray that extends in the pointing direction, from the hand of the user to the collision point with the virtual element; and
        selecting a second interaction mode in response to a determination that the virtual distance is greater than the threshold virtual distance.

2. The method of claim 1, wherein the second interaction mode is a point-based collision mode, and wherein the method further includes generating the collision point based on a position of a finger of the hand.

3. The method of claim 1, wherein the monitoring of the hand of the includes:
    determining a second hand property, the second hand property including a gesture performed by the hand; and
    executing an interaction with the virtual element in the selected interaction mode in response to the detected gesture.

4. The method of claim 1, wherein the monitoring of the hand of the user includes:
    determining a second hand property, including detecting a pose of the hand; and
    executing an interaction with the virtual element in the selected interaction mode in response to the detected pose.

5. The method of claim 1, wherein the monitoring of the hand includes:
    determining a second hand property, including detecting a movement of the hand, from a first physical position corresponding to a first virtual position in the AR environment, to a second physical position corresponding to a second virtual position in the AR environment; and
    executing an interaction with the virtual element in the selected interaction mode in response to the detected movement.

6. The method of claim 1, further comprising determining a contextual factor associated with the user, including:
    detecting a user gaze;
    determining a focus position in the AR environment associated with the detected user gaze; and
    identifying a virtual element in the AR environment based on the focus position.

7. The method of claim 1, further comprising determining a contextual factor associated with the user, including:
    presenting a virtual user interface that includes a plurality virtual elements, each of the plurality of virtual elements being associated with an interaction mode of the plurality of interaction modes;
    receiving a user selection selecting a virtual element of the plurality of virtual elements; and
    determining the contextual factor associated with the user to be the interaction mode associated with the selected virtual element.

8. The method of claim 1, further comprising determining a contextual factor associated with the user, including:
    determining a physical position of the hand of the user;
    mapping the physical position of the hand to a virtual position of the hand in the AR environment;
    determining a virtual distance from the virtual position of the hand to a user selectable virtual element in the AR environment; and
    determining the contextual factor based on the virtual distance.

9. A system, comprising:
    at least one processor; and
    a memory storing instructions that, when executed by the at least one processor, cause the system to:
        generate an augmented reality (AR) environment including a plurality of virtual elements selectable for interaction by a user of the system;
        detect a selection of a virtual element, of the plurality of virtual elements;
        monitor a hand of the user;
        determine at least one hand property based on the monitoring of the hand, the at least one hand property including a first hand property defining a physical position of the hand; and
        select an interaction mode, of a plurality of interaction modes, for interacting with the selected virtual element, based on the at least one hand property, including:

detect a virtual distance between a virtual position of the hand of the user and the selected virtual element;

select a first interaction mode in response to a determination that the virtual distance is less than or equal to a threshold virtual distance, the first interaction mode being a ray-based collision mode in which the instructions cause the system to generate a virtual ray that extends in a pointing direction of the hand, from the hand of the user to a collision point with the selected virtual element; and select a second interaction mode in response to a determination that the virtual distance is greater than the threshold virtual distance.

10. The system of claim 9, wherein the system includes a hand tracker, and wherein the instructions, when executed by the at least one processor, further cause the system to:

determine the physical position of the hand using the hand tracker;

map the physical position of the hand to a virtual position of the hand in the AR environment; and determine the virtual distance, the virtual distance extending from the virtual position of the hand to the selected virtual element in the AR environment.

11. The system of claim 10, wherein the instructions, when executed by the at least one processor, further cause the system to:

determine a second hand property based on a detected gesture performed by the hand; and execute an interaction with the selected virtual element in the selected interaction mode in response to the detected gesture.

12. The system of claim 10, wherein the instructions, when executed by the at least one processor, further cause the system to:

determine a second hand property based on a detected a pose of the hand; and execute an interaction with the selected virtual element in the selected interaction mode in response to the detected pose.

13. The system of claim 10, wherein the instructions, when executed by the at least one processor, further cause the system to:

determine a second hand property based on a detected a movement of the hand from a first physical position corresponding to a first virtual position in the AR environment, to a second physical position corresponding to a second virtual position in the AR environment; and execute an interaction with the selected virtual element in the selected interaction mode in response to the detected movement.

14. The system of claim 10, wherein the second interaction mode is a point-based collision mode, and wherein the instructions, when executed by the at least one processor, further cause the system to generate a collision point with the selected virtual element based on a detected position of a finger of the hand.

15. The system of claim 9, wherein the instructions, when executed by the at least one processor, further cause the system to select the interaction mode based on the at least one hand property and a contextual factor, including:

determine the contextual factor, including:

determine a focus position in the AR environment based on a detected gaze of the user; and identify a virtual element, of the plurality of virtual elements in the AR environment, based on the focus position, for selection by the user.

16. The system of claim 9, wherein the instructions, when executed by the at least one processor, further cause the system to select the interaction mode based on the at least one hand property and a contextual factor, including:

determine the contextual factor, including:

present a virtual user interface that includes a plurality virtual elements, each of the plurality of virtual elements being associated with an interaction mode of the plurality of interaction modes;

receive a user selection of one of the plurality of virtual elements of the virtual user interface; and determine the contextual factor associated with the user to be the interaction mode associated with the selected virtual element of the virtual user interface.

17. The system of claim 9, wherein the instructions, when executed by the at least one processor, further cause the system to select the interaction mode based on the at least one hand property and a contextual factor, including:

determine a physical position of the hand of the user;

map the physical position of the hand to a virtual position of the hand in the AR environment;

determine a virtual distance from the virtual position of the hand to a user selectable virtual element in the AR environment; and determine the contextual factor based on the virtual distance.

18. The system of claim 9, wherein the system includes a head mounted display device including a display device for display of the AR environment.

* * * * *